(12) United States Patent
Zhang et al.

(10) Patent No.: US 10,511,001 B1
(45) Date of Patent: Dec. 17, 2019

(54) COMPACT BATTERY-BASED ENERGY STORAGE SYSTEMS

(71) Applicant: Sinexcel, Inc., Palo Alto, CA (US)

(72) Inventors: Junheng Zhang, Rancho Cucumonga, CA (US); Ran Gao, Rancho Cucumonga, CA (US); Xiaobo Fan, Rancho Cucumonga, CA (US); Chenglei Wang, Rancho Cucumonga, CA (US); Haibin Lu, Rancho Cucumonga, CA (US); Wei Deng, Rancho Cucumonga, CA (US); Yingchuan Li, Rancho Cucumonga, CA (US); Jibo Zhang, Rancho Cucumonga, CA (US)

(73) Assignee: Sinexcel Inc., Rancho Cucumonga, CA (US)

( * ) Notice: Subject to any disclaimer, the term of this patent is extended or adjusted under 35 U.S.C. 154(b) by 0 days.

(21) Appl. No.: 16/356,996

(22) Filed: Mar. 18, 2019

(51) Int. Cl.
| | |
|---|---|
| H01M 2/10 | (2006.01) |
| H02S 40/38 | (2014.01) |
| H02J 7/00 | (2006.01) |
| H02J 7/35 | (2006.01) |
| H01M 10/42 | (2006.01) |
| H01M 4/505 | (2010.01) |
| H01M 4/525 | (2010.01) |
| H01M 10/613 | (2014.01) |

(Continued)

(52) U.S. Cl.
CPC ......... *H01M 2/1077* (2013.01); *H01M 4/505* (2013.01); *H01M 4/525* (2013.01); *H01M 4/5825* (2013.01); *H01M 10/425* (2013.01); *H01M 10/613* (2015.04); *H01M 10/663* (2015.04); *H02J 7/0013* (2013.01); *H02J 7/355* (2013.01); *H02S 40/38* (2014.12); *H01M 2010/4271* (2013.01); *H01M 2220/10* (2013.01)

(58) Field of Classification Search
None
See application file for complete search history.

(56) References Cited

U.S. PATENT DOCUMENTS

| | | | | |
|---|---|---|---|---|
| 6,164,369 | A * | 12/2000 | Stoller | H05K 7/20572 165/104.33 |
| 7,978,463 | B1 * | 7/2011 | Haun | E04H 5/02 312/223.2 |

(Continued)

*Primary Examiner* — Amanda J Barrow
(74) *Attorney, Agent, or Firm* — Zheng "Andy" Liu

(57) ABSTRACT

An example battery-based energy storage device that comprises: a battery chamber configured to host a plurality of rechargeable battery packs; an operation chamber separated from the battery chamber by at least an insulation board; an energy storage inverter mounted on the operation chamber; a battery control box mounted on the operation chamber and configured to control one or more operations of the plurality of rechargeable battery packs; a first door rotatably mounted on the battery chamber; a second door rotatably mounted on the battery chamber. The first door and the second door open outward and are on opposite sides of the battery chamber; and a third door rotatably mounted on the operation chamber. The energy storage inverter is configured to convert AC to DC when charging a rechargeable battery pack and to convert DC to AC when providing power to an external device from a rechargeable battery pack.

17 Claims, 3 Drawing Sheets

(51) Int. Cl.
*H01M 10/663* (2014.01)
*H01M 4/58* (2010.01)

(56) References Cited

U.S. PATENT DOCUMENTS

| | | | | |
|---|---|---|---|---|
| 2006/0158037 | A1* | 7/2006 | Danley | H02J 3/32 |
| | | | | 307/64 |
| 2009/0297933 | A1* | 12/2009 | Bielawski | H01M 2/1083 |
| | | | | 429/100 |
| 2012/0135674 | A1* | 5/2012 | Uehara | F24F 1/0007 |
| | | | | 454/338 |
| 2014/0260397 | A1* | 9/2014 | Agnaou | H02B 1/565 |
| | | | | 62/259.2 |
| 2016/0099598 | A1* | 4/2016 | Gray | H02J 7/0029 |
| | | | | 307/66 |
| 2017/0133642 | A1* | 5/2017 | Lee | H01M 2/1022 |
| 2017/0271726 | A1* | 9/2017 | Shen | H01M 10/613 |
| 2018/0337385 | A1* | 11/2018 | Schnakofsky | H01M 2/206 |
| 2018/0342892 | A1* | 11/2018 | Zhou | H02J 3/32 |
| 2019/0046820 | A1* | 2/2019 | Lee | F24F 11/0001 |
| 2019/0237995 | A1* | 8/2019 | Akita | H01M 10/44 |

\* cited by examiner

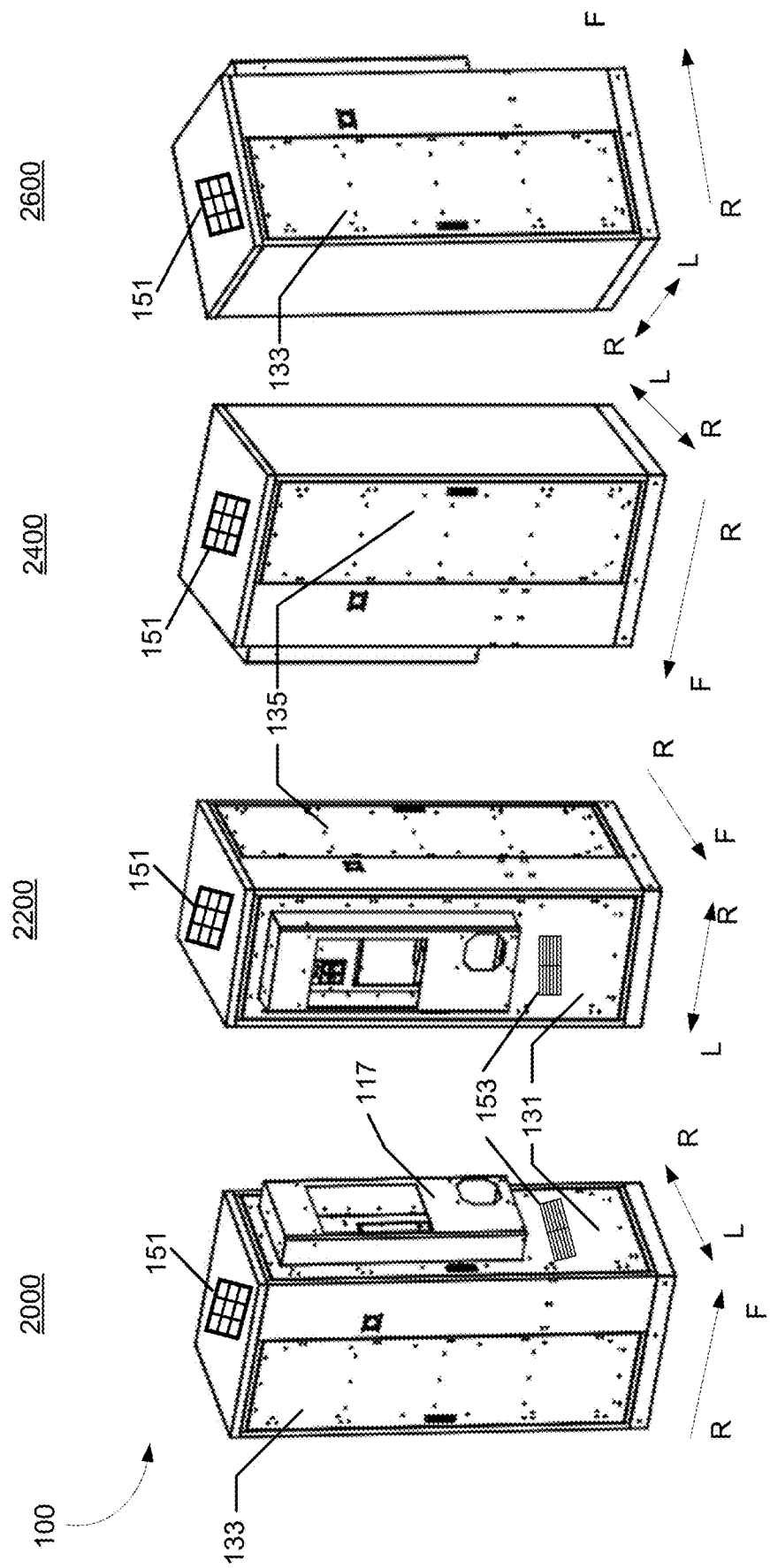

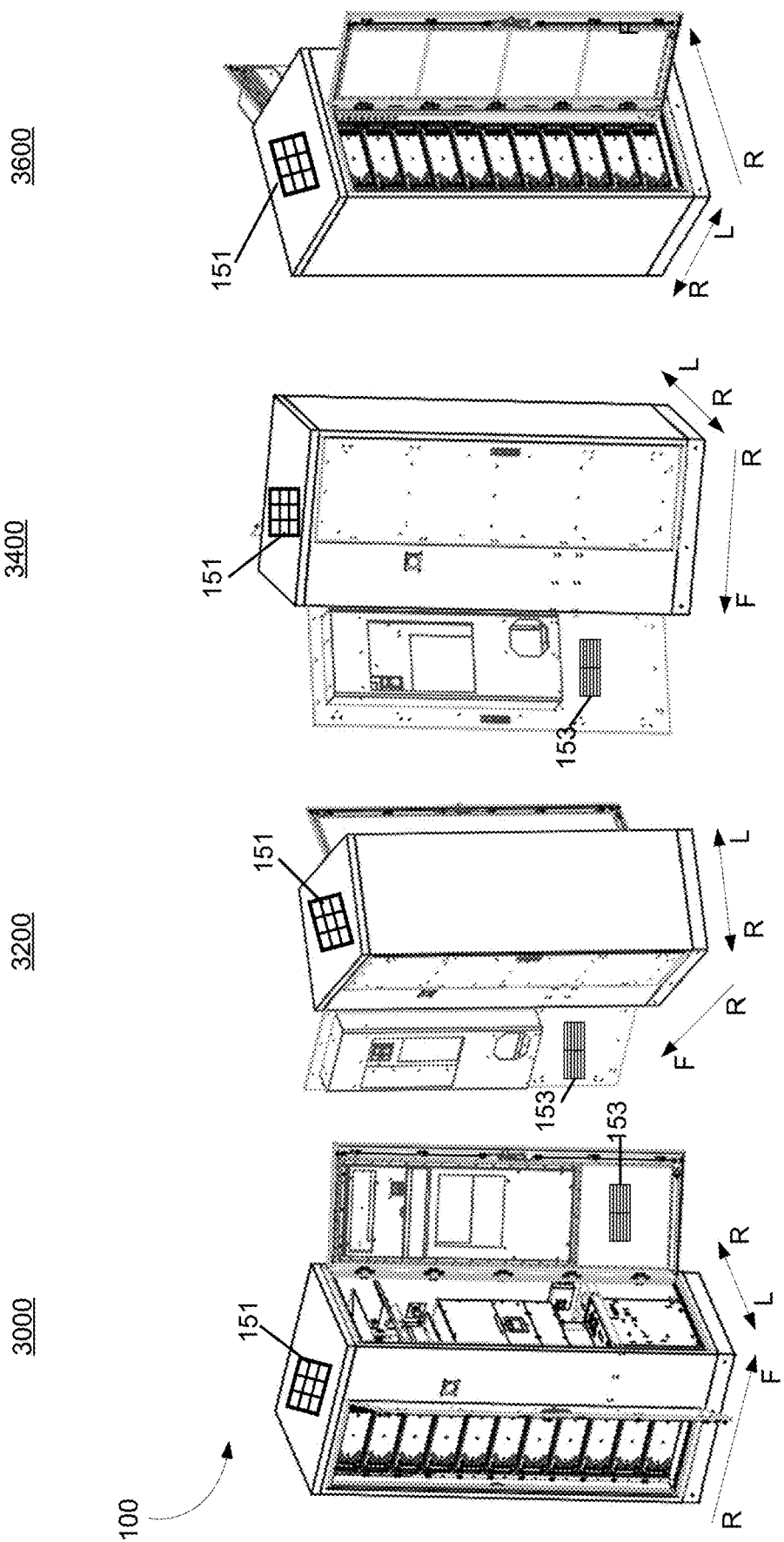

COMPACT BATTERY-BASED ENERGY STORAGE SYSTEMS

TECHNICAL FIELD

The present disclosure generally related to energy storage systems and more specifically to compact outdoor battery-based energy storage systems.

BACKGROUND

Traditionally, battery-based energy storage systems have been used to shave peak consumption and to function as back-up power supplies.

Technical challenges abound, however. Conventional battery-based energy storage devices often address only specific power consumption demands and are thus not well-adapted to handle consumption demands that vary from time to time. Risk may result from an energy system being unable to handle greater demands; on the flip side, waste may result from an energy system with a large number of under-producing units. Also, energy storage systems that are convenient for replacement, maintenance, expansion, and transportation are desired.

SUMMARY

Technologies relating to compact outdoor battery-based energy storage systems are provided.

A battery-based energy storage device, in some implementations, comprises: a battery chamber configured to host a plurality of rechargeable battery packs; an operation chamber separated from the battery chamber by at least an insulation board; an energy storage inverter mounted on the operation chamber, wherein the energy storage inverter is configured to convert AC to DC when charging a rechargeable battery pack in the plurality of rechargeable battery packs and to convert DC to AC when providing power to an external device from a rechargeable battery pack in the plurality of rechargeable battery packs; a battery control box mounted on the operation chamber and configured to control one or more operations of the plurality of rechargeable battery packs; a first door rotatably mounted on the battery chamber; a second door rotatably mounted on the battery chamber, and a third door rotatably mounted on the operation chamber. The first door and the second door open outward and are on opposite sides of the battery chamber In some implementations, the battery-based energy storage device further comprises: an air conditioner mounted on the third door that is mounted on the operation chamber.

In some implementations, the insulation board includes a protruding portion that covers at least some space above the operation chamber, so as to create an airway path from the plurality of rechargeable battery packs to the air conditioner.

In some implementations, the battery chamber and the operation chamber are separated in such a way that an airway path is formed above the operation chamber, wherein the airway path is formed between the battery chamber and the air conditioner.

In some implementations, the third door includes a ventilation opening 153 configured to circulate air flow in and out of the operation chamber, but not the battery chamber.

In some implementations, the air conditioner includes a fan unit mounted to the third door and is outside the operation chamber.

In some implementations, the fan unit is detachable from the third door of the operation chamber.

The battery-based energy storage device, in some implementations, is of a cuboid shape.

The battery-based energy storage device, in some implementations, is configured to be used in an outdoor environment.

The battery-based energy storage device, in some implementations, is configured to be used in an off-grid environment.

The battery-based energy storage device, in some implementations, is configured to charge the rechargeable battery packs using solar power collected by one or more solar panels 151.

In some implementations, battery packs in the plurality of rechargeable battery packs are configured to be slide into and out of the battery chamber horizontally using one or more sliding racks attached to the battery chamber.

The battery-based energy storage device, in some implementations, is configured to function without interruption, responsive to a rechargeable battery pack being removed from the plurality of rechargeable battery packs.

The battery-based energy storage device, in some implementations, is configured to host the plurality of rechargeable battery packs in a single column.

The battery-based energy storage device, in some implementations, is configured to function without interruption, responsive to a rechargeable battery pack being added to the plurality of rechargeable battery packs.

In some implementations, a rechargeable battery pack in the plurality of rechargeable battery packs comprises two tray handles attached to the rechargeable battery packs.

In some implementations, the battery-based energy storage device further comprises: a fire extinguisher placed within a predefined proximity to the battery control box.

In some implementations, the battery-based energy storage device further comprises: a door latch attached to the first door and configured to lock or unlock access to the battery chamber.

In some implementations, a rechargeable battery in the plurality of rechargeable battery packs is a lithium iron phosphate (LFP) battery or a lithium nickel manganese cobalt oxide ($LiNiMnCoO_2$ or NMC) battery.

In some implementations, a maximum battery capacity of the plurality of rechargeable battery packs is 60 kWh.

BRIEF DESCRIPTION OF THE DRAWINGS

FIG. 2A is a block diagram illustrating a first perspective view of an example battery-based energy storage device with one or more doors closed in accordance with some implementations of the present disclosure.

FIG. 2B is a block diagram illustrating a second perspective view of an example battery-based energy storage device with one or more doors closed in accordance with some implementations of the present disclosure.

FIG. 2C is a block diagram illustrating a third perspective view of an example battery-based energy storage device with one or more doors closed in accordance with some implementations of the present disclosure.

FIG. 2D is a block diagram illustrating a fourth perspective view of an example battery-based energy storage device with one or more doors closed in accordance with some implementations of the present disclosure.

FIG. 3A is a block diagram illustrating a first perspective view of an example battery-based energy storage device with one or more doors opened in accordance with some implementations of the present disclosure.

FIG. 3B is a block diagram illustrating a second perspective view of an example battery-based energy storage device with one or more doors opened in accordance with some implementations of the present disclosure.

FIG. 3C is a block diagram illustrating a third perspective view of an example battery-based energy storage device with one or more doors opened in accordance with some implementations of the present disclosure.

FIG. 3D is a block diagram illustrating a fourth perspective view of an example battery-based energy storage device with one or more doors opened in accordance with some implementations of the present disclosure.

The implementations disclosed herein are illustrated by way of example, and not by way of limitation, in the figures of the accompanying drawings. Like reference numerals refer to corresponding parts throughout the drawings.

DETAILED DESCRIPTION

Figure 1:
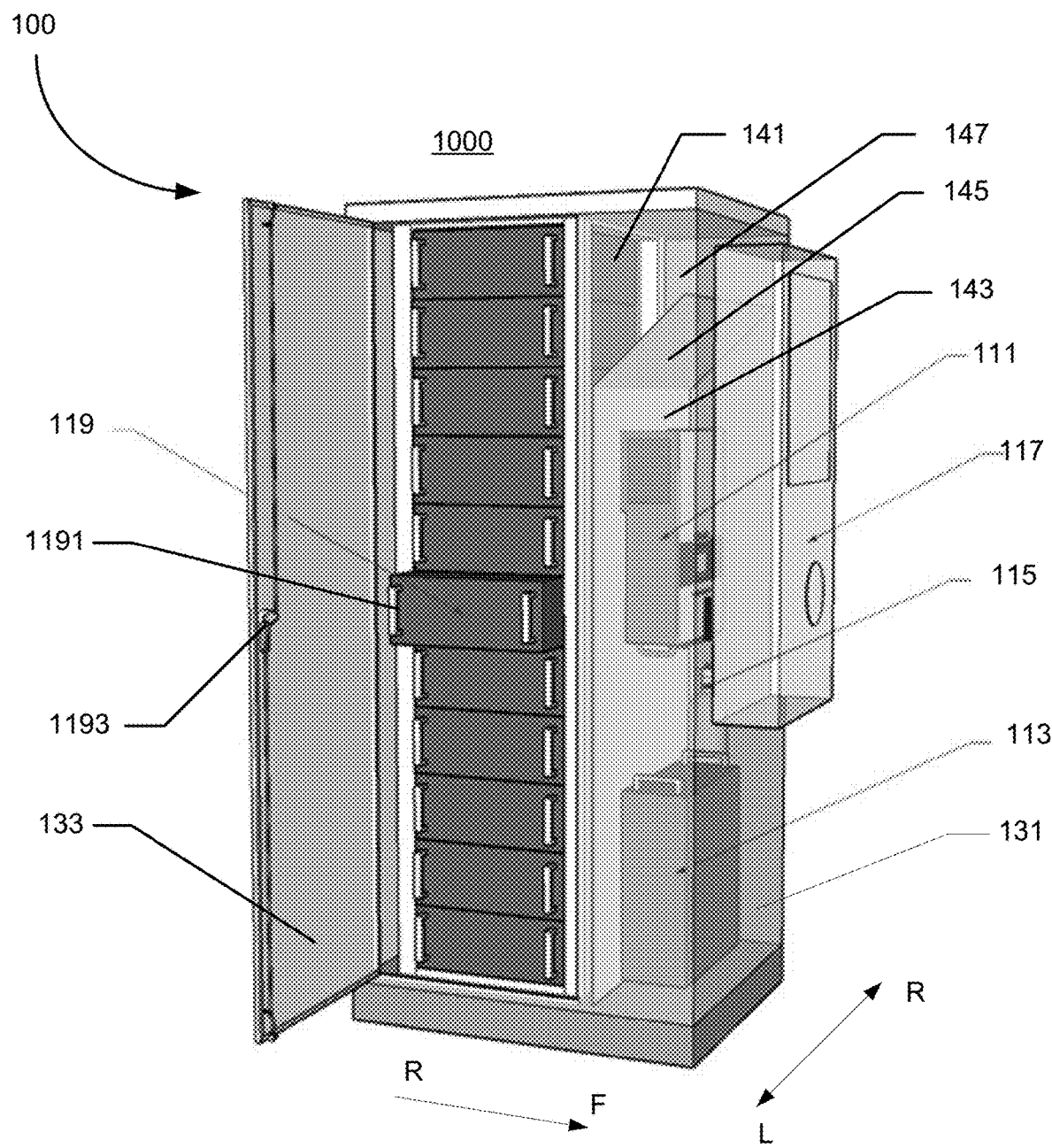
FIG. 1 is a block diagram illustrating a perspective view of an example battery-based energy storage device in accordance with some implementations of the present disclosure.

Technologies relating to compact outdoor battery-based energy storage systems are disclosed. These technologies may provide the following technical advantages.

First, various designs for battery chambers described in the present disclosure provide greater accessibility to operators or maintenance personnel for replacing or expanding battery banks, maintaining and repairing components within an energy storage container, for example, energy storage inverters, a fire extinguisher system, a battery control box, and an air condition system. Also, the non-walk-in design, e.g., doors that open outward, reduces the risk of trapping operators or maintenance personnel inside an energy storage container.

Second, a compartmentalized energy storage container enables energy saving, since the battery chamber and the operation chamber are separated and can be operated independently with separated air circulations and conditionings.

Third, standardized and compact battery modules described in the present disclosure are convenient to transport.

FIG. 1 is a block diagram 1000 illustrating a perspective view of an example battery-based energy storage device 100 in accordance with some implementations of the present disclosure.

As shown in FIG. 1, the battery-based energy storage device 100 includes a plurality of battery trays 119, an energy storage inverter 111, a battery control box 113, a fire extinguisher 115, and an air conditioning device 117. Each battery tray 119 includes an independently-operated battery capable of storing electrical energy and providing electrical energy, as needed. For example, the battery-based energy storage device 100 may operate when only half of the total number of batter trays have been installed. More battery trays may be added while the battery-based energy storage device 100 is operating. In other words, the battery-based energy storage device 100 is capable of plug-and-play, without interruption. In some implementations, two or more battery trays 119 may be connected serially or in parallel with each other.

Battery Chamber and Operation Chamber

In some implementations, the battery-based energy storage device 100 includes a battery chamber 141 and an operation chamber 143.

The battery chamber 141, in some implementations, hosts a plurality of battery trays 119. A battery tray may include a battery of at least the following types: a lithium iron phosphate (LFP) battery, and a lithium nickel manganese cobalt oxide (LiNiMnCoO$_2$ or NMC) battery. The energy density of batteries equipped in the battery-based energy storage device 100 may vary; in some implementations, the maximum battery capacity of LFP limited by a container is approximately 60 kWh.

A battery tray 119, in some implementations, is a pullout tray with one or more tray handles 1191 attached to front sided of the battery tray 119. In some implementations, each battery tray is supported by at least one set of floor mount sliding brackets or rails, each of which is attached to each side of the battery chamber 141. The sliding brackets allow battery trays to be added to and removed from the battery chamber with ease.

The battery chamber 141, in some implementations, is equipped with both a left door 133 and a right door; these two doors are rotatably mounted on the opposite sides of the battery chamber 141. The doors, in some implementations, open outward, rendering the battery chamber 141 compact and capable of hosting a greater number of battery trays. In some implementations, the left door 133 may be rotatably mounted on either the back side or the front side of the battery chamber 141. Similarly, the right door may also be rotatably mounted on either the back side or the front side of the battery chamber 141. In some implementations, a left door latch 1193 is attached to the left door 133; the door latch 1193 enables a user to lock or unlock the battery chamber 141.

Besides the battery chamber 141, the battery-based energy storage device 100 may also include an operation chamber 143. As shown in FIG. 1, the operation chamber 143 may host an energy storage inverter 111, a battery control box 113, and a fire extinguisher 115.

In some implementations, the energy storage inverter 111 is mounted on a side wall of the operation chamber 143. The battery control box 113 may be mounted either on a side wall of the operation chamber 143 or to the floor of the operation chamber 143, below the energy storage inverter 111. The operation chamber 143 may also host a fire extinguisher 115 inside. In some implementations, the front door 131 is rotatably mounted on the operation chamber 143.

The battery-based energy storage device 100 may be of a container shape without any protruding parts, rendering it convenient for transportation, by road, by railway, by sea, or by air. The container design also protects components installed inside the container from containment, dust, or accidental damages. When battery-based energy storage device 100 is installed and operates in an outdoor environment, the container design may prevent erosion by the rain or snow.

In some implementations, an air conditioner 117 is installed on the front door 131. The cooling and heating unit of the air conditioner 117 is placed inside the operation chamber 143, while the fan unit of the air conditioner 117 is placed outside the operation chamber 143 (or outside the container).

The air conditioner 117 may provide cooling, heating, or room temperature air circulation, to the battery trays 119 and to keep the internal ambient temperature consistent. In some implementations, the air conditioner 117 may be detachable for easier transportation or maintenance.

FIG. 2A is a block diagram 2000 illustrating a first perspective view of an example battery-based energy storage device with one or more doors closed in accordance with some implementations of the present disclosure.

FIG. 2B is a block diagram 2200 illustrating a second perspective view of an example battery-based energy storage device with one or more doors closed in accordance with some implementations of the present disclosure.

FIG. 2C is a block diagram 2400 illustrating a third perspective view of an example battery-based energy storage device with one or more doors closed in accordance with some implementations of the present disclosure.

FIG. 2D is a block diagram 2600 illustrating a fourth perspective view of an example battery-based energy storage device with one or more doors closed in accordance with some implementations of the present disclosure.

FIG. 3A is a block diagram 3000 illustrating a first perspective view of an example battery-based energy storage device with one or more doors opened in accordance with some implementations of the present disclosure.

FIG. 3B is a block diagram 3200 illustrating a second perspective view of an example battery-based energy storage device with one or more doors opened in accordance with some implementations of the present disclosure.

FIG. 3C is a block diagram 3400 illustrating a third perspective view of an example battery-based energy storage device with one or more doors opened in accordance with some implementations of the present disclosure.

FIG. 3D is a block diagram 3600 illustrating a fourth perspective view of an example battery-based energy storage device with one or more doors opened in accordance with some implementations of the present disclosure.

As shown in FIGS. 2A and 2B, when the left door 133, the front door 131, and the right door 135 are closed, the battery-based energy storage device 100 is secured and protected from contamination and damage. The air conditioner 117 is, in some implementations, detachable from the battery-based energy storage device 100, eliminating any protruding part from the container and rendering it convenient for transportation and storage.

Heat Dissipation and Air Conditioning System

In some implementations, the battery-based energy storage device 100 includes the battery chamber 141 and the operation chamber 143, as shown in FIG. 1. The battery chamber 141 and the operation chamber 143 are separated; each is equipped with its own independent air circulation and air conditioning (e.g., heating, cooling, or both). The separate-chamber design reduces energy consumption and results in power saving, because the battery sets often require more effective and vigorous cooling, while the operation devices (e.g., the fire extinguisher and the battery control box) do not. The separate-chamber design thus reduces unnecessary energy consumption for air-conditioning of the operation devices.

Furthermore, the battery chamber 141 and the operation chamber 143 are, in some implementations, separated with an insulation board 145. An air pathway 147 between the battery chamber 141 and the air conditioner 117 is therefore formed above the operation chamber 143. This air pathway 147 can result in not only more efficient dissipation of heat that may result from the battery sets being charged or supplying power, but also more efficient provision of cooling air through air conducts into the bottom portion of the battery chamber 141.

Energy Storage Inverter System

In some implementations, the energy storage inverter 111, when in the discharging mode, converts the DC power supplied by the battery sets to AC power needed by the recipient devices, and when in the charging mode, converts the AC power supplied by external power sources to DC power needed by the battery sets.

In some implementations, the energy storage inverter 111 is capable of functioning in at least the following operation modes: (1) a utility-interactive mode (also known as a P-Q mode); and (2) a stand-alone mode (also known as an off-grid mode or a V-F mode).

(1) Utility-Interactive Mode (Also Called the P-Q Mode)

In the Utility-interactive mode, the reference voltage and a constant frequency may be provided by an external power source (usually a utility power grid), and the active power and the reactive power can be commanded to change on the inverter 111.

(2) Stand-Alone Mode (Also Called the Off-Grid Mode or the V-F Mode)

In the sand-alone mode, regardless of any changes in the inverter power, the amplitude and frequency of output voltage remain constant, the inverter of V/F control may provide voltage and frequency support for the micro-grid during an islanded operation. The inverter may act as a voltage source. The current amplitude and PF will be determined by the sum of the generation (if any) and the consumption load.

Fire Extinguisher System

In some implementations, the fire extinguisher 115 may be preinstalled, depending on an end user's specific demand. The fire extinguisher 115 is stored in compliance with all applicable laws or regulations (e.g., municipal, state, federal laws or regulations), for example, the NFPA regulations and the FEMA regulations.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation(s).

It will also be understood that, although the terms "first," "second," etc. may be used herein to describe various elements, these elements should not be limited by these terms. These terms are only used to distinguish one element from another. For example, a first door could be termed a second door, and, similarly, a second door could be termed the first door, without changing the meaning of the description, so long as all occurrences of the "first door" are renamed consistently and all occurrences of the "second door" are renamed consistently. The first door and the second door are both doors, but they are not the same door.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well-known instruction instances, protocols, structures, and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A battery-based energy storage device comprising:
   a plurality of rechargeable battery packs;
   a battery chamber configured to host the plurality of rechargeable battery packs;
   an operation chamber separated from the battery chamber by at least an insulation board;
   an energy storage inverter mounted on the operation chamber, wherein the energy storage inverter is configured to convert AC to DC when charging a rechargeable battery pack in the plurality of rechargeable battery packs and to convert DC to AC when providing power to an external device from a rechargeable battery pack in the plurality of rechargeable battery packs;
   a battery control box mounted on the operation chamber and configured to control one or more operations of the plurality of rechargeable battery packs;
   a first door rotatably mounted on the battery chamber;
   a second door rotatably mounted on the battery chamber, wherein the first door and the second door open outward and are on opposite sides of the battery chamber;
   a third door rotatably mounted on the operation chamber; and
   an air conditioner mounted on the third door, wherein the insulation board includes a protruding portion that covers at least some space above the operation chamber, so as to create an airway path from the plurality of rechargeable battery packs to the air conditioner.

2. The battery-based energy storage device as claimed in claim 1, wherein the battery chamber and the operation chamber are separated in such a way that an airway path is formed above the operation chamber, wherein the airway path is formed between the battery chamber and the air conditioner.

3. The battery-based energy storage device as claimed in claim 1, wherein the third door includes a ventilation opening configured to circulate air flow in and out of the operation chamber, but not the battery chamber.

4. The battery-based energy storage device as claimed in claim 1, wherein the air conditioner includes a fan unit mounted to the third door and is outside the operation chamber.

5. The battery-based energy storage device as claimed in claim 4, wherein the fan unit is detachable from the third door of the operation chamber.

6. The battery-based energy storage device as claimed in claim 1 is of a cuboid shape.

7. The battery-based energy storage device as claimed in claim 1, wherein the energy storage inverter is configured to function in a utility-interactive mode during which an external power source provides a voltage to the energy storage inverter.

8. The battery-based energy storage device as claimed in claim 1, wherein the energy storage inverter is configured to function in a stand-alone mode during which the energy storage inverter provides a voltage to a power consumption device.

9. The battery-based energy storage device as claimed in claim 8 is configured to charge the rechargeable battery packs using solar power collected by one or more solar panels.

10. The battery-based energy storage device as claimed in claim 1, wherein the first door and the second door open outward in a horizontal manner.

11. The battery-based energy storage device as claimed in claim 1, wherein the battery control box is mounted either on a side wall of the operation chamber or to a floor of the operation chamber.

12. The battery-based energy storage device as claimed in claim 1 is configured to host the plurality of rechargeable battery packs in a single column.

13. The battery-based energy storage device as claimed in claim 1, wherein a rechargeable battery pack in the plurality of rechargeable battery packs comprises two tray handles attached to a battery tray.

14. The battery-based energy storage device as claimed in claim 1, further comprising:
   a fire extinguisher placed within a predefined proximity to the battery control box.

15. The battery-based energy storage device as claimed in claim 1, further comprising:
   a door latch attached to the first door and configured to lock or unlock access to the battery chamber.

16. The battery-based energy storage device as claimed in claim 1, wherein a rechargeable battery in the plurality of rechargeable battery packs is a lithium iron phosphate (LFP) battery or a lithium nickel manganese cobalt oxide (LiNiMnCoO$_2$ or NMC) battery.

17. The battery-based energy storage device as claimed in claim 1, wherein a maximum battery capacity of the plurality of rechargeable battery packs is 60 kWh.

* * * * *